United States Patent [19]

Osborne

[11] 4,003,837
[45] Jan. 18, 1977

[54] SELF-CLEANING STRAINER

[76] Inventor: Winston G. Osborne, 3270 Goyer St., Apartment 5, Montreal, Quebec, Canada, H3S 1J1

[22] Filed: May 28, 1974

[21] Appl. No.: 474,138

[30] Foreign Application Priority Data

May 29, 1973 United Kingdom ............ 25385/73

[52] U.S. Cl. .............................. 210/408; 210/413; 241/43; 241/88.2
[51] Int. Cl.² ........................................ B01D 29/38
[58] Field of Search ............ 210/70, 107, 158, 159, 210/173, 174, 355, 396, 397, 407, 408, 413, 414, 242 R, 152; 241/166, 167, 29, 43, 74, 83, 88.2, 89.3

[56] References Cited

UNITED STATES PATENTS

| 722,632 | 3/1903 | Rothe | 210/407 |
| 944,241 | 12/1909 | Jordan | 241/74 |
| 2,218,119 | 10/1940 | McAllister | 210/173 |
| 2,408,741 | 10/1946 | Dodge | 210/355 |
| 3,247,970 | 4/1966 | Jellesma | 210/174 |
| 3,640,474 | 2/1972 | Niedl | 210/174 |
| 3,741,104 | 6/1973 | Kannegiesser | 241/166 |
| 3,802,566 | 4/1974 | Hata | 210/174 |

Primary Examiner—Charles N. Hart
Assistant Examiner—Ivars Cintins
Attorney, Agent, or Firm—Bacon & Thomas

[57] ABSTRACT

The invention is directed towards a straining means in a cooling system which has a cooling medium inlet, a cooling medium outlet, a screen located between the inlet and outlet and means operable on the inlet side of the screen for keeping the screen clean and free of foreign objects. When using a cylindrical screen, the means for keeping the screen clean comprises a spiral screw-type member rotatable within the cylindrical screen and having means along at least a portion of its edge for grinding foreign material on the inlet side of the screen into a size small enough to pass through the screen.

7 Claims, 5 Drawing Figures

SELF-CLEANING STRAINER

BACKGROUND OF THE INVENTION

1. Field of the Invention

This invention is directed toward an automatic self-cleaning strainer.

The invention is more particularly directed toward a self-cleaning strainer which is employed in the cooling system of ships.

2. Description of the Prior Art

Cooling systems in ships use water taken in through an inlet in the hull of the ship. The cooling system includes a screen or strainer for removing foreign objects from the water. Normally, the strainer does not become readily clogged or blocked with foreign objects.

However, in the late fall and early winter season, when the ships are travelling through colder waters, ice and/or a mixture of ice and weeds may be drawn in by the cooling system in a quantity to clog or block the strainer thus reducing the amount of cooling water taken into the system. This in turn could result in damage to the units being water-cooled.

The present invention is directed towards means for preventing strainers employed in these cooling systems from becoming clogged with foreign objects, particularly ice, or ice and weeds, when the ship travels through colder waters at certain times of the year.

SUMMARY OF THE INVENTION

The invention is more particularly directed towards a straining means in a cooling system which has a cooling medium inlet, a cooling medium outlet, a screen located between the inlet and outlet and means operable on the inlet side of the screen for keeping the screen clean and free of foreign objects.

In a preferred embodiment, when using a cylindrical screen, the means for keeping the screen clean comprises a spiral screw-type member rotatable within the cylindrical screen and having means along at least a portion of its edge for grinding foreign material on the inlet side of the screen into a size small enough to pass through the screen.

BRIEF DESCRIPTION OF THE DRAWINGS

The invention will now be described in detail having reference to the accompanying drawings wherein.

DESCRIPTION OF THE PREFERRED EMBODIMENTS

Figure 1:
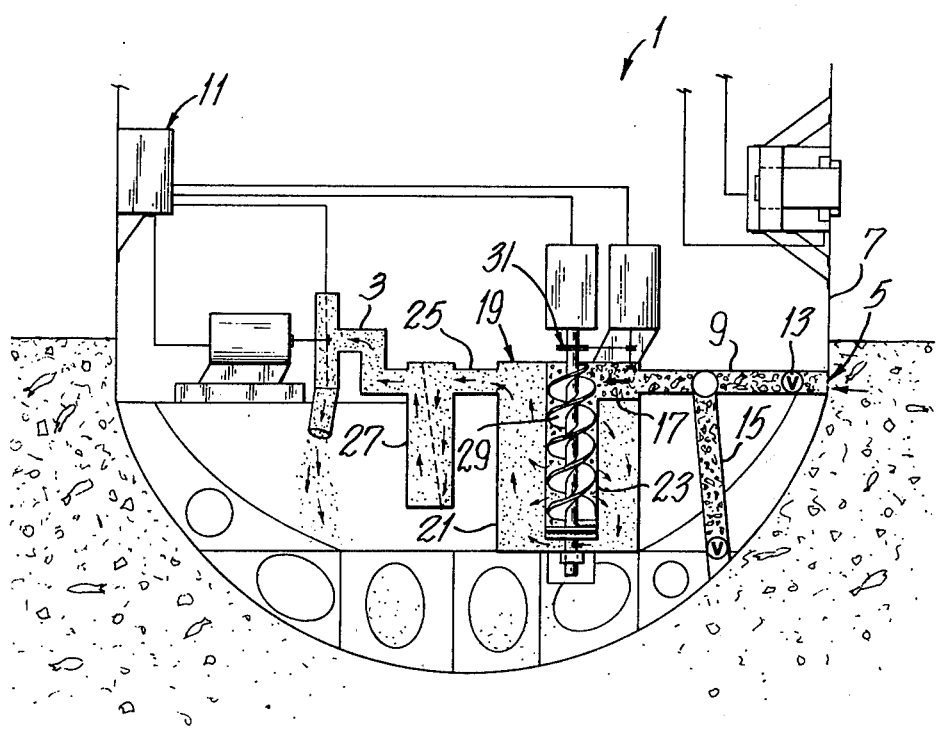
FIG. 1 is a cross-section view of a ship's hull showing a cooling system employing a strainer according to the present invention.

The ship 1 shown in FIG. 1 has a cooling system 3 which has an inlet 5 in the side of the ship's hull 7. A conduit 9 leads from the inlet 5 to a distributing means 11 which delivers the water to units on the ship to be water-cooled. A shut-off valve 13 is provided in the conduit 9 adjacent the inlet 5. A branch conduit 15 can be provided for bypassing the cooling system and directing the water back out of the hull. The conduit 9 bringing in the cooling water is connected to an inlet 17 on a strainer 19. The strainer, as shown more clearly in FIG. 2, preferably comprises an outer cylindrical casing 21 and an inner concentric cylindrical screen 23. The casing 21 has an outlet 25 from where the water passes to a fine strainer 27 then to the distributing means 11.

A spiral, screw-type member 29 is rotatably mounted within screen 23. The member 29 is rotated by a belt and pulley system 31. The edge 33 of the cleaning member 29 has teeth 35 so that as the member is rotated the edge 33 rides against the inner surface of the screen and the teeth 35 break down or cut through material such as ice or weeds which might otherwise clog or block the opening 37 in the screen. The smaller particles formed are then carried through the screen by the water as indicated by the arrows 38.

The spiral member 29 terminates at an edge 39 at the bottom end. The bottom edge 39 has a serrated plate 41 attached thereto. The serrated plate 41 cooperates with a toothed bottom plate 43 which closes the bottom of the cylindrical screen 23. The serrated plate 41 cooperates with the toothed bottom plate 43 to grind material located therebetween. Once the material is small enough, it is flushed out by the water through a ring of openings 45 located adjacent the bottom plate 43.

It will be seen that the edge 33 of the spiral member covers the entire inner surface of the screen 23 as the member 29 rotates thus periodically cleaning the inner surface to prevent particles from blocking the flow of water to the cooling system of the ship. The spiral member 29 preferably is rotated at a speed between 50 and 100 r.p.m.

Figure 3:
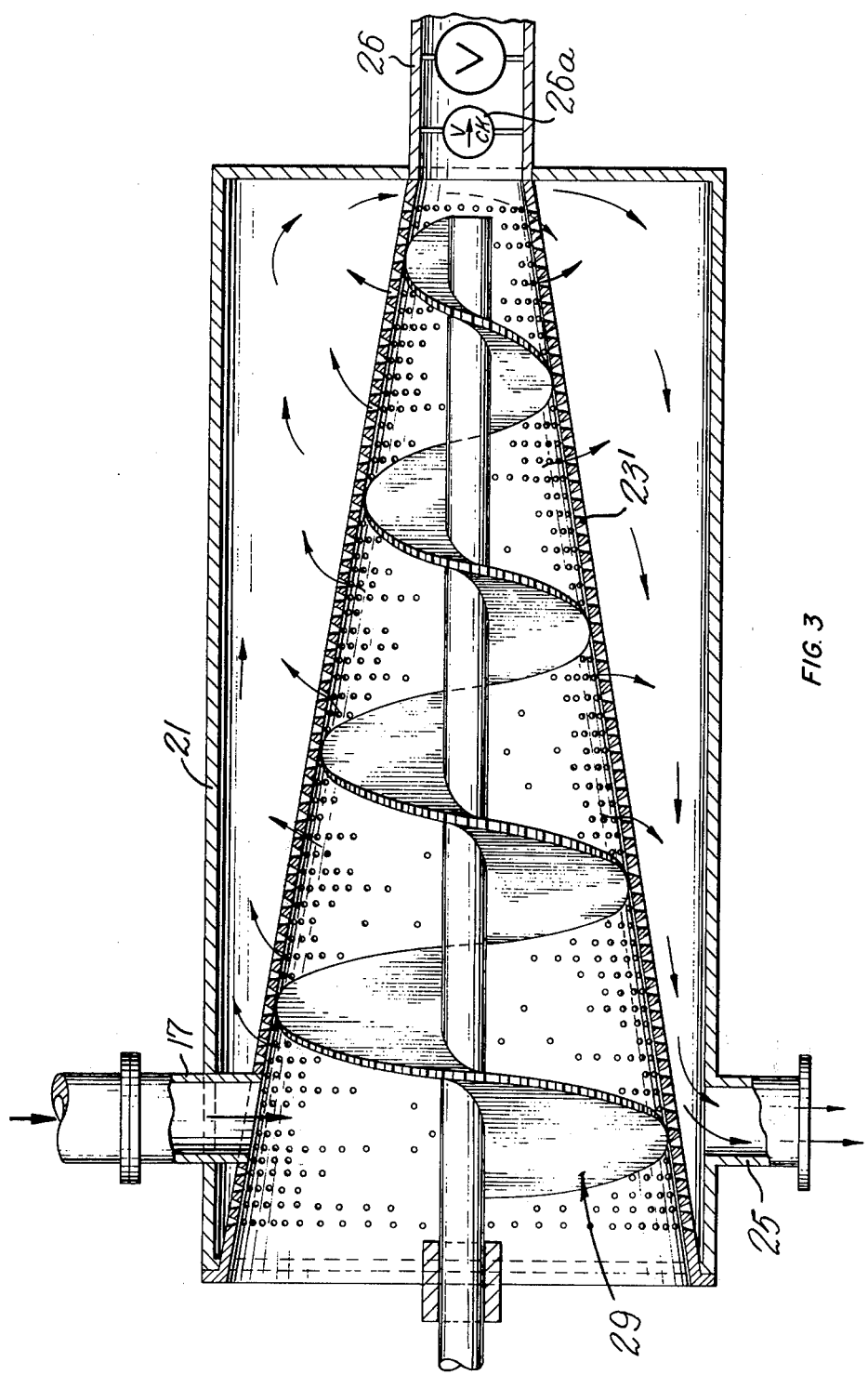
FIG. 3 is a detailed view of another embodiment of a strainer which is mounted horizontally.

In another embodiment, the cylindrical screen 23' can be tapered as shown in FIG. 3 and will be mounted horizontally. In this embodiment the spiral member 29' is also tapered. The screen 23' is positioned within a cylindrical casing 21 as before having inlet means 17 for directing cooling water into the screen and outlet means 25. This arrangement will be seen to forcibly discharge the solid particles which have not been able to pass through the screen 23' at the exit end 26 outside the ship, into the sea. In this case there is provided a check valve 26a which will prevent any entry of water which would back up into the strainer when the exit end is below sea level.

Figure 2:
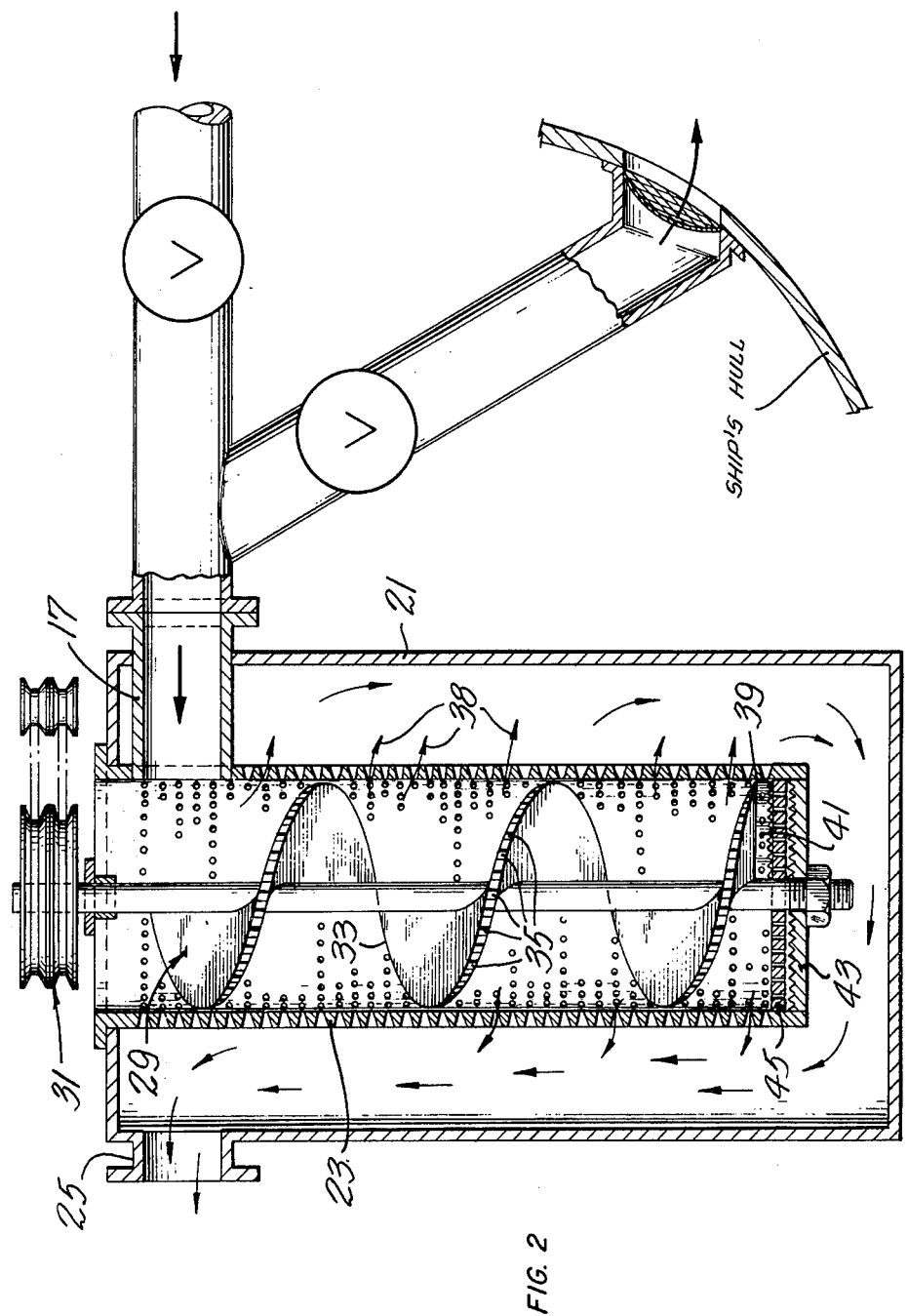
FIG. 2 is a detailed view of one embodiment of the strainer.
Figure 4:
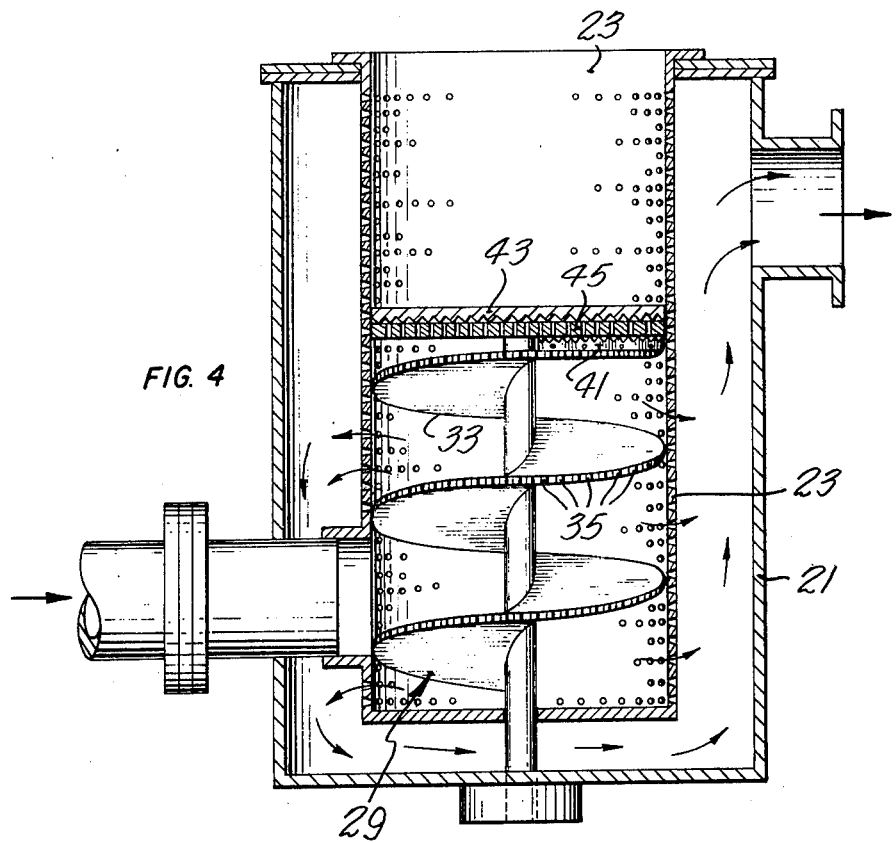
FIG. 4 is a detailed view of yet another embodiment of the strainer according to the invention.
Figure 5:
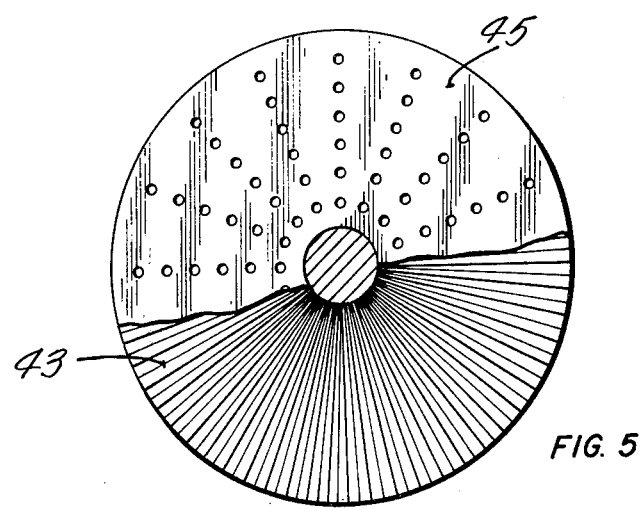
FIG. 5 is a view of the crusher shown in FIGS. 2 and 4.

Instead of having the crusher at the lower end of the spiral member 23 as shown in FIG. 2, it might be advantageous at times to mount the crusher at the upper end of the screen on top of the spiral member. In this case it is only necessary to displace the inlet and outlet 17, 25 as shown in FIG. 4.

Obviously, the spiral member can be substituted by any device which will serve the purpose. For example, it might be possible to mount a rotatable shaft inside the screen 23 and to provide thereon eccentric means such as a square cross-section elongated member in which the axis is not parallel with the axis of the shaft. This will be sufficient to force all foreign objects towards the screen and upwardly in the case of objects unable to pass through the screen. Instead of using a crusher as described above, it might also be possible to mount blades of the blender type on the shaft. These blades will obviously mince or finely crush the solid material which does not pass through the screen.

I claim:

1. A self-cleaning strainer for reducing the size of foreign objects in a fluid used in the cooling system of a ship comprising:
   a. a fluid inlet;
   b. a fluid outlet;
   c. a screen receiving fluid from said inlet;
   d. spiral screw means on the inlet side of said screen for keeping said screen free of foreign objects;
   e. said spiral screw means having a first crushing means comprising a serrated edge thereon for grinding and crushing foreign matter on the inlet side of said screen, whereby said foreign matter is reduced in size and passes through said screen;
   f. a second crushing means at an axial end of said spiral screw means for crushing foreign matter that is not ground and crushed by said serrated edge on said spiral screw, and
   g. a casing surrounding said screen for conveying the fluid and reduced foreign matter therefrom to said outlet.

2. A self-cleaning strainer as defined in claim 1, wherein said screen is cylindrical.

3. A self-cleaning strainer as defined in claim 2 wherein:
   a. said screen and said spiral screw means are mounted vertically; and
   b. said second crushing means is at the lower end of said cylindrical screen.

4. A self-cleaning strainer as defined in claim 3 wherein said second crushing means comprises:
   a. a serrated plate attached to said end of said spiral screw;
   b. a toothed bottom plate means spaced apart from said serrated plate at the bottom of said screen for cooperating with said serrated plate, wherein
   c. said bottom plate means has a perforated section in the region between the teeth thereon and said serrated plate, whereby any material not crushed by said serrated edge on said spiral screw means is repeatedly acted upon by said second crushing means until sufficiently reduced in size to pass through the perforations in said perforated section.

5. A self-cleaning strainer according to claim 2, wherein said cylindrical screen and said spiral screw-type member are mounted vertically and said second crushing means is provided at the upper end of said cylindrical screen to receive and crush solid particles which have not passed through said screen and are forced into said crusher by said spiral screw-type member.

6. A self-cleaing strainer according to claim 5, wherein said second crushing means comprises a serrated plate attached at the upper edge of said spiral screw-type member, and toothed plate closing the upper end of said screen and cooperating with said serrated plate, said serrated plate formed with openings to enable said solid particles to pass therethrough and to be received between said serrated plate and said toothed plate where they are ground, a ring of openings being located adjacent the bottom plate to flush out ground solid particles into said outlet.

7. A self-cleaning strainer according to claim 2, wherein both said screen and said spiral screw-type member are tapered and are mounted horizontally, and means are provided for dumping outside said ship solid materials which have not passed through the screen into the cooling system.

* * * * *